(12) United States Patent
Anderson et al.

(10) Patent No.: US 6,427,891 B1
(45) Date of Patent: Aug. 6, 2002

(54) VEHICLE MOUNTED HAND TRUCK CARRIER

(75) Inventors: Gavin Anderson, Milwaukie; Doug Pepper, Gaston, both of OR (US)

(73) Assignee: Freightliner Corporation

( * ) Notice: Subject to any disclaimer, the term of this patent is extended or adjusted under 35 U.S.C. 154(b) by 0 days.

(21) Appl. No.: 09/558,958

(22) Filed: Apr. 25, 2000

(51) Int. Cl.[7] .................................................. B60R 9/06
(52) U.S. Cl. ..................... 224/536; 224/42.38; 224/570; 248/316.6
(58) Field of Search .................................. 224/488, 570, 224/536, 47.38, 323; 248/316.5, 316.6

(56) References Cited

U.S. PATENT DOCUMENTS

| | | | | |
|---|---|---|---|---|
| 2,106,503 A | * | 1/1938 | Hendrick | ..................... 224/488 |
| 2,171,053 A | * | 8/1939 | White et al. | ............. 224/42.38 |
| 2,546,233 A | * | 3/1951 | Pankonin | ................. 224/42.38 |
| 2,554,650 A | * | 5/1951 | Waite | ...................... 224/42.38 |
| 2,575,458 A | * | 11/1951 | Merrill | .................... 224/42.38 |
| 2,630,257 A | * | 3/1953 | Nielsen | ................... 224/42.38 |
| 2,682,982 A | * | 7/1954 | Fischer, Jr. | ............. 224/42.38 |
| 3,105,666 A | * | 10/1963 | Orr | ............................. 224/488 |
| 3,132,780 A | * | 5/1964 | Binding | ................... 224/42.38 |
| 3,443,730 A | | 5/1969 | Meusel | |
| 3,512,689 A | * | 5/1970 | Metropoulos | ............ 224/42.38 |
| 3,638,844 A | * | 2/1972 | Bronson | ................... 224/42.38 |
| 4,400,129 A | | 8/1983 | Eisenberg et al. | |
| 5,236,342 A | | 8/1993 | Pellettier | |
| 5,244,221 A | * | 9/1993 | Ward | ......................... 280/70.7 |
| 5,328,066 A | | 7/1994 | Cappuccio et al. | |
| 5,346,357 A | | 9/1994 | Hassell | |
| 5,489,109 A | * | 2/1996 | Murphy | ................... 280/47.27 |
| 5,522,530 A | | 6/1996 | Boettcher | |
| 5,673,834 A | * | 10/1997 | Cannon | ..................... 224/533 |
| 5,738,261 A | | 4/1998 | Dula | |
| 6,149,361 A | * | 11/2000 | Schader | ..................... 410/102 |
| 6,193,123 B1 | * | 2/2001 | Adamczweski et al. | .... 224/405 |

* cited by examiner

Primary Examiner—Stephen P. Garbe
(74) Attorney, Agent, or Firm—Klarquist Sparkman, LLP (57) ABSTRACT

A hand truck carrier for securing a hand truck to a vehicle includes a carrier body and first and second members coupled to the body. The carrier body is attachable to the vehicle. The first and second members are selectively positionable in at least an open position and a closed position. In the open position, the members are spaced apart from each other to define therebetween a base plate receiving space in which a base plate of a hand truck can be received. In the closed position, the members are positioned closer to each other than in the open position, and to contact and apply a clamping force to top and bottom surfaces of the base plate, respectively, thereby securing the hand truck to the hand truck carrier.

24 Claims, 8 Drawing Sheets

VEHICLE MOUNTED HAND TRUCK CARRIER

FIELD OF THE INVENTION

This invention relates to hand truck carriers, and specifically to a hand truck carrier designed to be secured to a vehicle, e.g., to the front of a delivery truck.

BACKGROUND OF THE INVENTION

In various businesses where delivery of goods is required, a need often arises to utilize a hand truck, dolly or cart in conjunction with a vehicle. The typical hand truck has a platform or base plate for receiving an article to be moved, a pair of wheels mounted rearwardly of the base plate, a frame (e.g., a pair of side rails) extending upwardly from the base plate, and a handle on an upper end of the frame opposite the wheels and base plate. Typically, the base plate and frame are joined at a right angle such that (1) the hand truck can rest upright on the base to facilitate loading and unloading, (2) items such as boxes can be stacked on the base plate and against the frame and (3) a loaded hand truck can be moved by tipping the frame at an angle to the ground and pushing or pulling the hand truck to roll it on its wheels.

The hand truck is generally used for transporting loads to and from the vehicle. Hand trucks are generally used to allow one person to conveniently and safely move a load, often through narrow spaces, such as aisles, etc.

The hand truck can be placed inside the delivery vehicle when moving from site to site, but repeatedly lifting and stowing the hand truck consumes time and effort. In addition, the hand truck takes up space inside the vehicle where items for delivery could be stored. Storing the hand truck inside the vehicle also increases the likelihood that items stored inside the vehicle will be damaged as the hand truck is moved.

An alternative to placing the hand truck inside the vehicle is to mount the hand truck on the outside of the vehicle. When the hand truck is mounted on the outside of the vehicle, there is a need to secure the hand truck using a reliable and safe device that is easily accessible to the operator, yet deters theft of the hand truck while the vehicle is unattended.

Several devices for mounting a hand truck are known. For example, U.S. Pat. No. 5,522,530 discloses an electronically activated hand truck carrier in which the hand truck blade is inserted between a pair of stationary plates, and the upper portion of the hand truck is secured by a pair of opposing claws that rotate inwardly to clamp the hand truck against a portion of the frame of the carrier.

U.S. Pat. No. 5,738,261 describes a carrier for a specific type of cart designed for pool maintenance that has a lower tubular frame member in the place of the hand truck blade, and a similar upper tubular frame member vertically spaced from the lower tubular frame member. The lower tubular frame member is engaged over a saddle plate, and the upper tubular member fits below a plate and is secured in place by pivotable latch arms. U.S. Pat. Nos. 5,328,066, 5,236,342, and 3,443,730 describe other vehicle mounted hand truck carriers.

However, a need still remains in the art for a reliable device for mounting a hand truck on a vehicle that is secure, allows easy access by the operator, and which minimizes the risk of theft.

SUMMARY

According to one implementation, a hand truck carrier is capable of securing a hand truck by applying a clamping force to opposite surfaces of the base plate of the hand truck. The carrier may include a carrier body and first and second members coupled to the body. The hand truck carrier can be attached to a vehicle, e.g., at a front bumper of the vehicle or other suitable locations.

The first and second members may be selectively positionable in at least an open position and a closed position. In the open position, the members are spaced apart from each other, thus defining a base plate receiving space. In the closed position, the members are positioned closer to each other than in the open position such that they apply the clamping force. The first member may be stationary, and the second member may be movable relative to the first member. The first member may be a base forming part of the carrier body, and the second member may be channel-shaped clamp member that is slidingly opposed to the base.

The carrier may include a mechanism for moving one of the members relative to the other. The mechanism may include a handle and a linkage connected to the handle, to the carrier body and to the second member, such that moving the lever moves the second member relative to the first member. The handle may be pivotably attached to the carrier body, and may extend through a slot in the carrier body.

The linkage may include a first link that is pivotably connected at a first end to the carrier body and a second link that is pivotably connected at a first end to the second member, with opposite second ends of the links being pivotably connected to each other. The pivotable connection between the first end of the second link and the second member may be a pivot (e.g., a pivot bolt) that extends through a slot formed in the carrier body, such that the movement of the pivot and the second member is constrained by the slot. Similarly, the pivotable connection between the first end of the first link and the carrier body may be a pivot (e.g., a pivot bolt) that extends through a slot formed in the carrier body such that the pivot is constrained to move within the slot.

In the closed position, the first link may be angled with respect to the second link. When the carrier is changed from the closed position to the open position, the linkage may pass through a point at which the first link and the second link are aligned.

The carrier body may include a stop positioned to prevent the linkage from moving beyond a predetermined position. The linkage may also include a connecting member that is pivotably connected at one end to the first link and pivotably connected at an opposite end to the lever. The pivotable connection between the lever and the carrier body may be offset from the pivotable connection between the connecting member and the lever.

The clamping force applied by the first and second members may be adjustable. A suitable clamping force adjustment arrangement may include a bracket attached to the carrier body, an adjustment bolt threaded through the bracket and positioned to bear against the first link. With the adjustment arrangement, the adjustment bolt can be rotated, which causes the first link to move in a direction of the slot through which the first link pivot extends, thereby changing the clamping force.

The mechanism for moving one of the members relative to the other may be manually actuated, electrically actuated or pneumatically actuated. In an electrically actuated implementation, the mechanism includes an electrical power source and switch connected to solenoid, the solenoid being connected to the second member. Specifically, the solenoid may include a moving element that is connected to the linkage. A pneumatically actuated mechanism is similar, except that a pneumatic power source and switch are connected to a pneumatic solenoid.

The present invention is directed toward novel and nonobvious aspects of a hand truck carrier both alone and in combination with one another and as defined by the claims below.

DETAILED DESCRIPTION

According to embodiments of the invention, a hand truck carrier secures a hand truck to the carrier by applying a clamping force to opposite surfaces of a hand truck base plate. In a typical configuration, the hand truck is secured in the carrier in an upright position between a stationary base member and a clamp member that is slidingly opposed to the base member.

Figure 7:
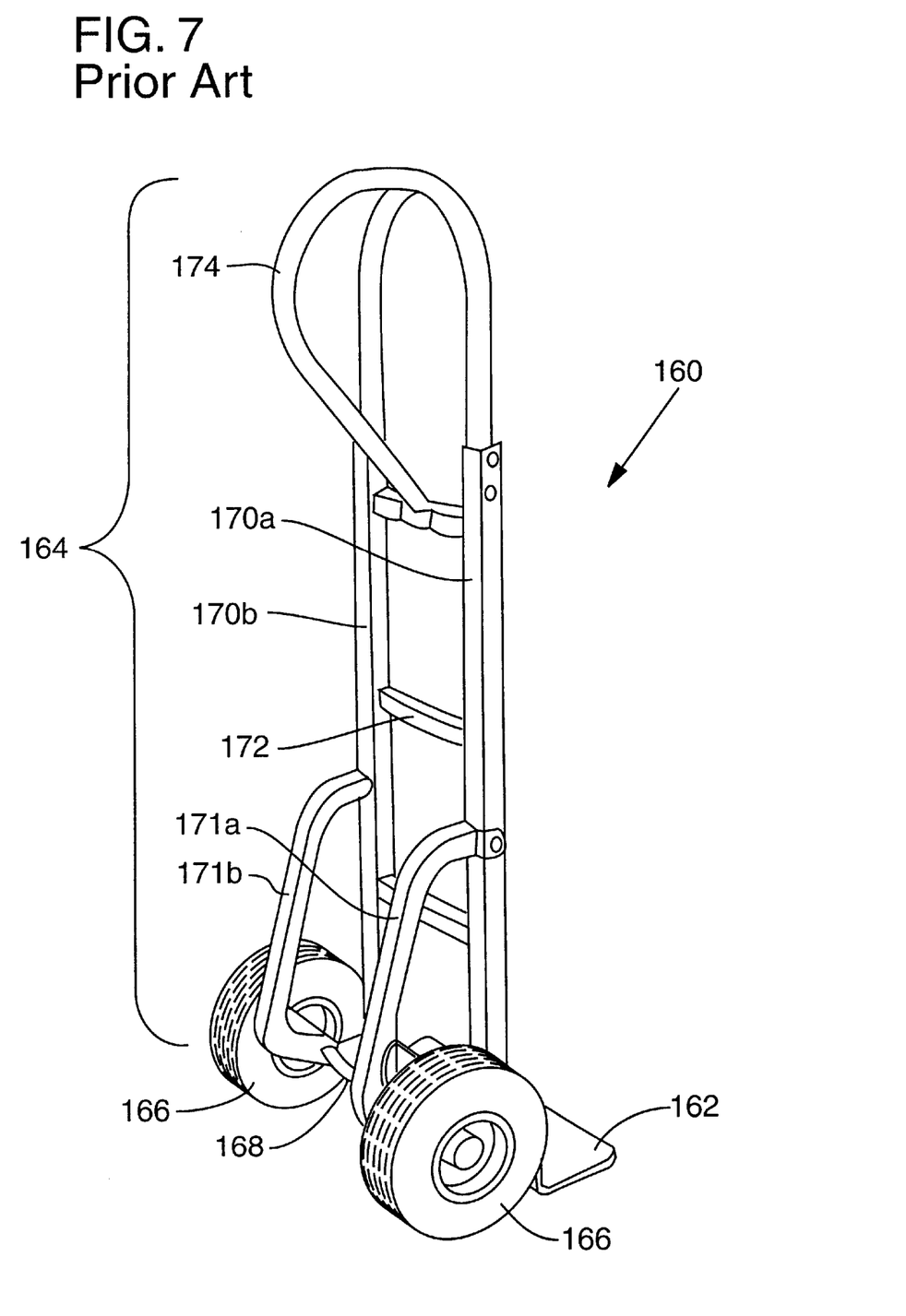
FIG. 7 is a perspective view of a conventional hand truck that can be used with the hand truck carrier of FIGS. 1–6.

An example of a conventional hand truck 103 is illustrated in FIG. 7. As shown, the hand truck 103 has a base plate 162 that is joined to an upwardly extending frame 164. A pair of wheels 166 are rotatably mounted on an axle 168 attached to the frame 164 rearward of the base plate 162. As shown, the frame 164 has a pair of vertically extending side members 170a, 170b, a cross member 172 that connects the side members 170a, 170b, support members 171a, 171b, and a handle portion 174 at an upward end of the frame 164. The base plate 162 is joined to the frame 164 at a right angle and receives articles to be transported. Other forms of hand trucks may also be carried by the mechanism of this invention.

Figure 1:
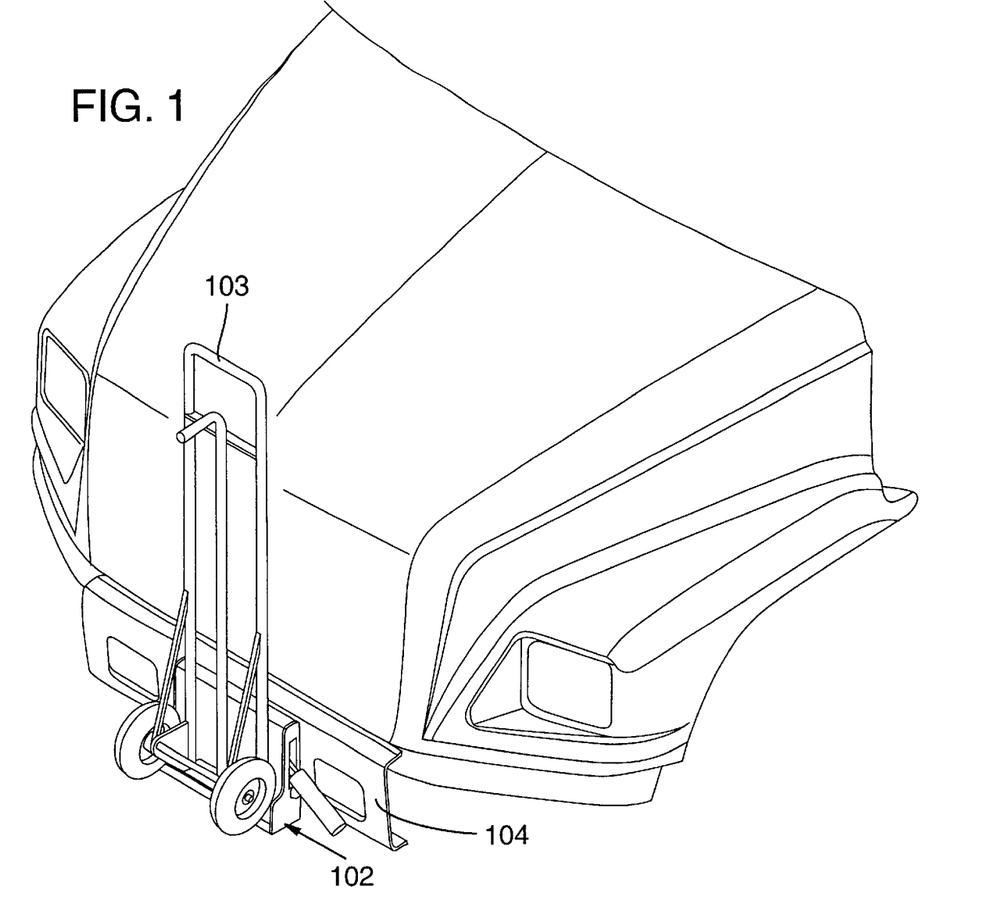
FIG. 1 is a perspective view showing a portion of a truck with a hand truck carrier according to one embodiment of the invention mounted to a front bumper of the truck.

Referring to FIG. 1, a vehicle 100 includes a carrier 102 for securing a conventional hand truck, such as the hand truck 103, to the vehicle 100 during transit and other times when the hand truck 103 is not in use.

FIGS. 2, 3A, 3B and 4 show a specific implementation of the carrier 102. The carrier 102 has a carrier body 102a that can be mounted to a front bumper 104 of the vehicle 102, or at any other suitable location, e.g., with bolts or by another suitable method (such as welding). As illustrated, the carrier body 102a has a base or a first member 110 that is sized at least as wide as the base plate 162 or blade (or other projecting load carrying element) of the hand truck 103. The carrier 102 includes a mechanism for selectively securing the hand truck 103 in place. One such mechanism comprises a lever 106 that is connected by a linkage 108 to a movable clamp member or second member 112. In the illustrated implementation, the first and second members 110, 112 are positioned to extend horizontally or laterally, and thus may also be referred to as first and second lateral members, respectively. Of course, the same concepts apply if the carrier 102 is arranged in an alternative orientation, e.g., if the carrier 102 secures the hand truck 103 in its horizontal orientation (i.e., with its base portion 162 in a vertical orientation and secured by first and second members 110, 112 that extend vertically).

In the illustrated implementation, moving the lever 106 moves the clamp member 112 with respect to the base 110 so that the hand truck 103 can be respectively released from or secured in the carrier 102 between the clamp member 112 and the base 110. When the carrier 102 is in the open position as shown in FIG. 3B, the clamp member 112 and the base 110 are separated from each other, defining a base plate receiving space 113. In the illustrated implementation, pivoting the lever 106 upwardly and downwardly respectively raises and lowers the clamp member 112 with respect to the base 110, which in this embodiment remains stationary.

In alternative constructions, the base 110 may move relative to element 112 or both may move. Thus, in an alternative implementation (not shown), the lever 106 is configured to raise and lower the base 110 with respect to the clamp member 112, which remains stationary. In yet another implementation (not shown), the lever 106 is configured to move both the base 110 and the clamp member 112 with respect to each other. According to this arrangement, moving the lever 106 causes the base 110 and the clamp member 112 to move toward each other (e.g., with the base 110 moving upwardly and the clamp member 112 moving downwardly).

Figure 2:
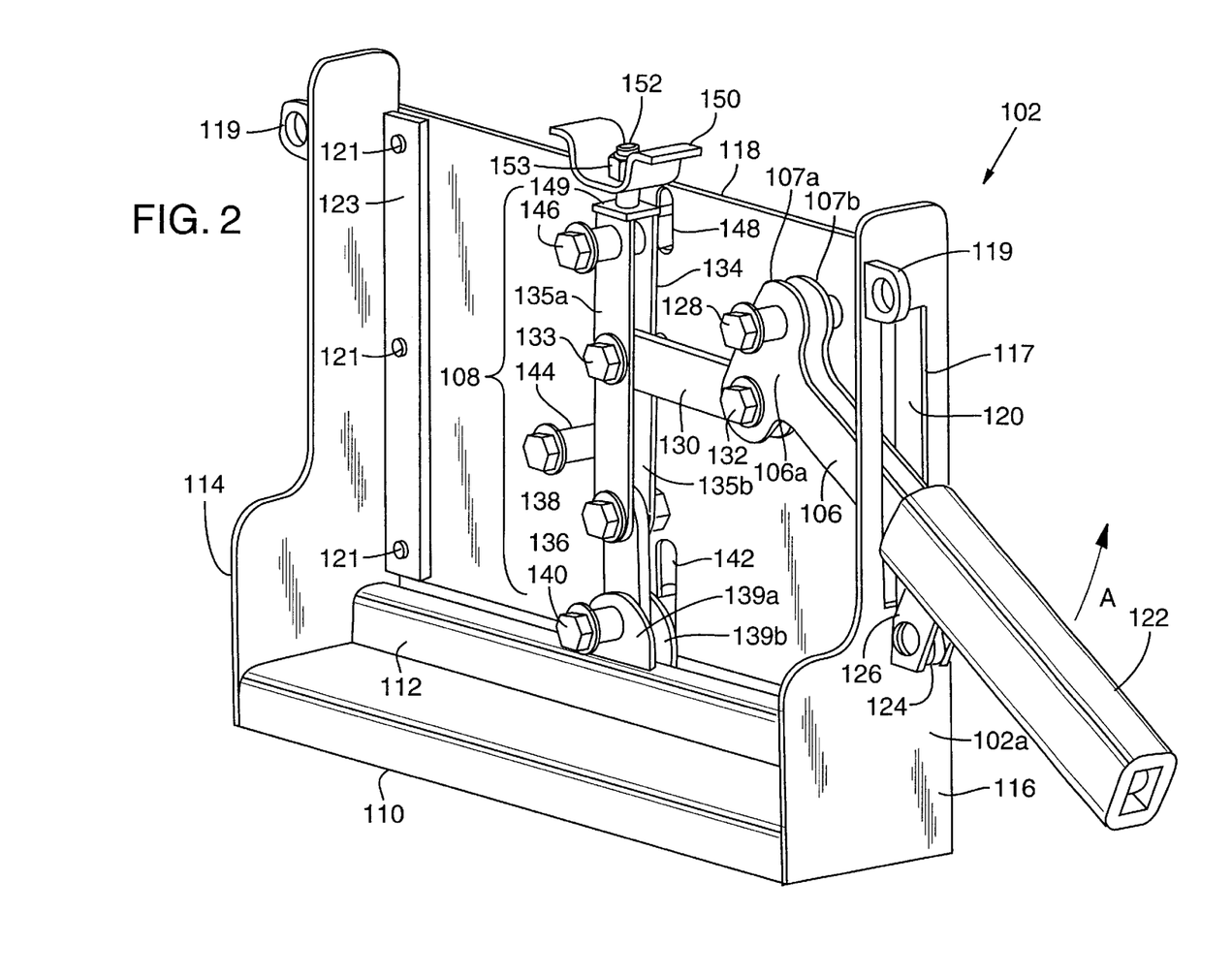
FIG. 2 is a perspective view of the hand truck carrier of FIG. 1 with a cover plate removed to show the configuration of interior components when the carrier is in a closed position.
Figure 3A:
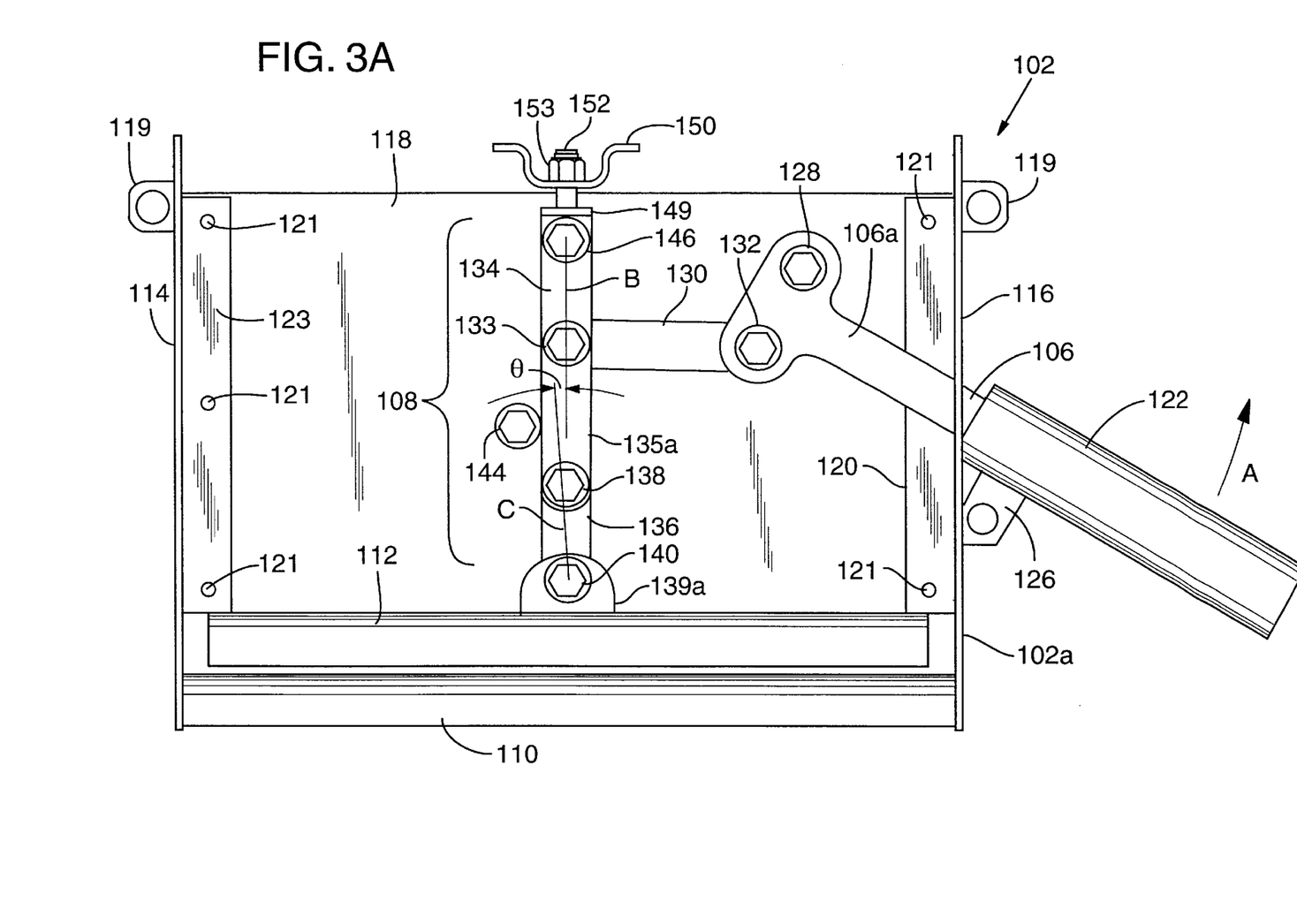
FIG. 3A is a front view of the hand truck carrier of FIG. 2.
Figure 3B:
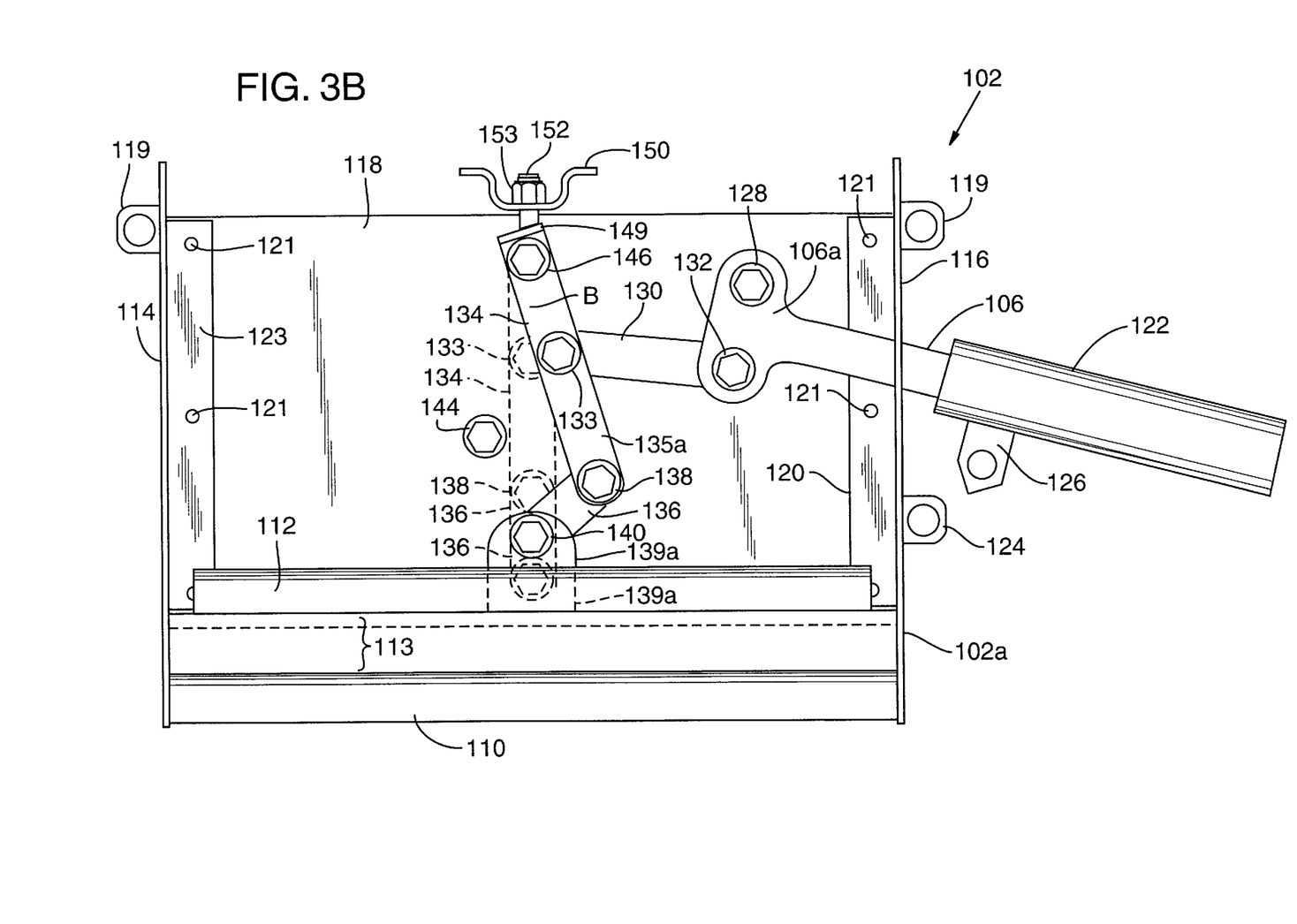
FIG. 3B is similar to FIG. 3A, but shows the hand truck carrier in an open position.

Referring to FIGS. 2, 3A and 3B, the base 110 may be a plate-like member with a rounded upper corner or nose 110a, which allows the base portion 162 of the hand truck 103 to be received more readily. The base 110 may be fitted with a base pad 110a formed of a resilient material such as rubber, e.g., to dampen vibrations. The clamp member 112 may be channel-shaped, e.g., as a section of inverted U-shaped channel material, as shown.

Figure 4:
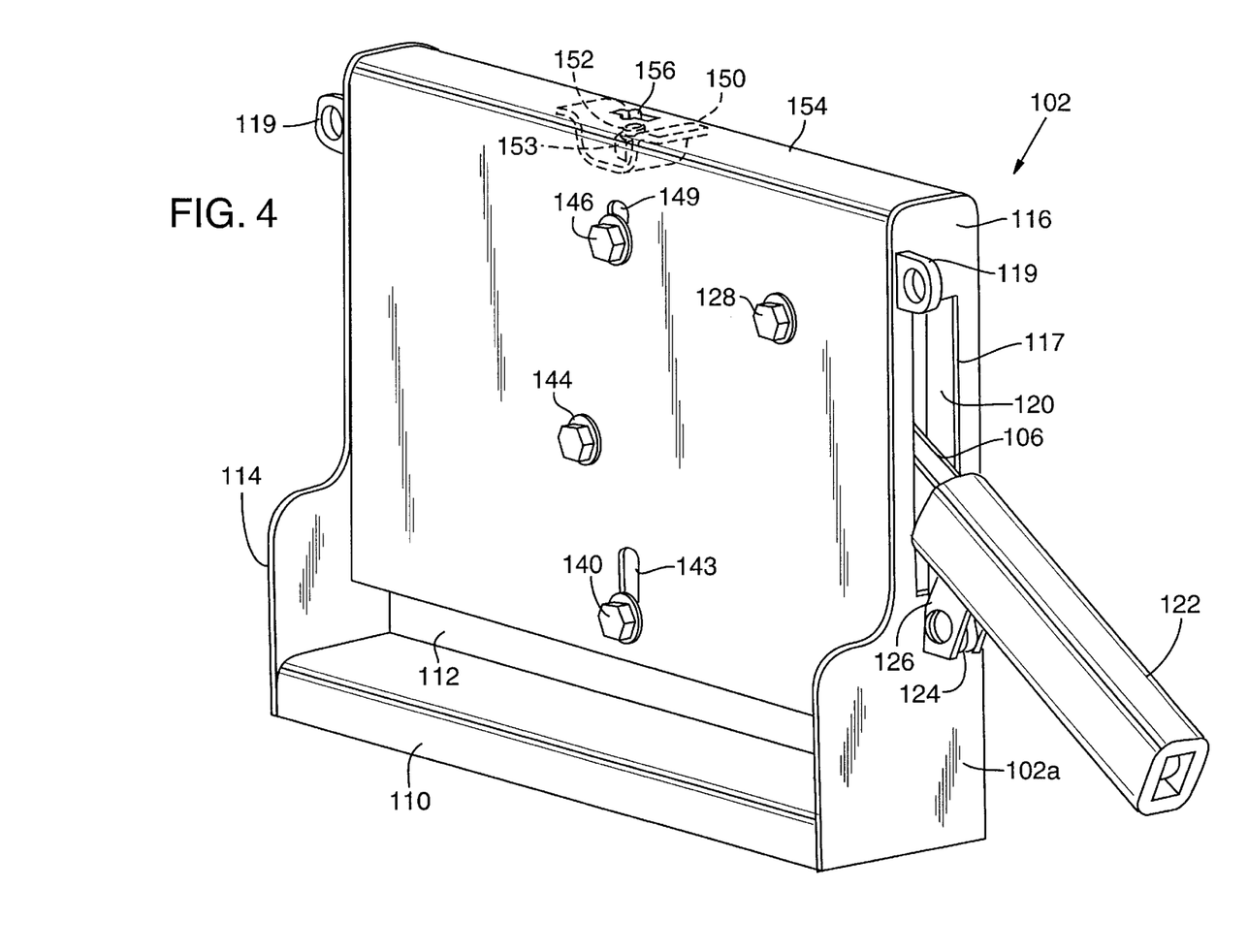
FIG. 4 is a perspective view of the hand truck carrier similar to FIG. 2, except with the cover plate installed.

The carrier body 102a in the form shown includes a first side plate 114 and a second side plate 116 that are each attached or coupled to sides of the base 112. The side plate 116 includes a lever slot 117 within which the lever 106 can be moved between the open position (FIG. 3B) and the closed position (as shown in FIGS. 2, 3A and 4). If desired, eyelets 119 positioned on each of the side plate 114 and the side plate 116 can be used to attach a back-up security chain for securing the hand truck 103 to the carrier 102, although such a chain is not necessary.

A rear plate 118 extends between the side plate 114 and the side plate 116. The rear plate 118 may, for example, be attached by fasteners 121 to a side flange 123 extending from the side plate 114 and to a side flange 120 extending from the side plate 116.

The lever 106 in one form is bifurcated with matching outer and inner spaced apart lever members 107a and 107b that are secured together. The lever 106 is typically fitted with a lever cover 122 made of rubber, polymer or other suitable material. The lever 106 may have a lever locking eyelet 124 that can be aligned with a side locking eyelet 126 extending from the side plate 116 (FIG. 3B). When the lever 106 is in the closed position (as shown in FIGS. 2, 3A and 4), a lock shackle (not shown) can be inserted through the aligned lever locking eyelet 124 and side locking eyelet 126 to lock the position of the lever 106, and thus prevent unauthorized release of the lever 106.

To raise the clamp member 112 and thus release the hand truck 103, the lever 106 is moved upwardly in the direction of arrow A. In the illustrated implementation, an interior end 106a of the lever 106, together with a connecting member 130, an upper link 134, a lower link 136 and their associated pivots, as described below, form one suitable form of linkage 108, through which movement of the lever 106 moves the clamp member 112.

The lever 106 is pivotably mounted to the back plate 118 by a lever pivot bolt 128. The interior end 106a of the lever 106 is pivotably connected with a first end of the connecting member 130 by a connecting member bolt 132. The pivot axis of connecting member bolt 132 is spaced from or offset from the pivot axis through lever pivot bolt 128. A second end of the connecting member 130 is pivotably connected to the upper link 134 by a connecting member bolt 133.

The upper or first link 134 in the form shown includes matching outer and inner link members 135a and 135b. The upper link 134 and an upper end of the lower or second link 136 are pivotably interconnected at a lower pivot bolt 138, with the lower link 136 being received between the respective outer and inner link members 135a and 135b. A lower end of the lower link 136 is pivotably connected to the clamp member 112 between outer and inner gusset plates 139a and 139b by a lower guide bolt 140. The lower guide bolt 140 extends through and is constrained to travel within a substantially vertical lower guide bolt slot 142 formed in the back plate 118.

The upper end of the upper link 134 has an upper guide bolt 146 that extends through an upper guide bolt slot 148 formed in the rear plate 118.

As explained more fully below, a clamping force adjustment device may be included to adjust the spacing between elements 110 and 112 when in a closed or clamping position. In one specific form, and others may be used, the upper link 134 includes a top plate 149. A bracket nut 153, through which the adjustment bolt 152 is threaded, is welded in place on the bracket 150. As shown, the adjustment bolt 152 bears against the top plate 149. Normally, as shown in dashed lines in FIG. 4, the bracket 150 is attached to an under surface of an upper section of a cover plate 154 (e.g., by welding), and thus remains stationary when the lever 106 is raised or lowered. The cover plate 154 has been omitted from FIGS. 2 and 3 for clarity. Tightening and loosening the bolt 152 adjusts the clamping force.

With the geometry of the linkage 108 shown in the illustrated embodiment, particularly regarding the first link 134, the second link 136, the pivot 146 and the slot 148, the pivot 140 and the slot 142, and the pivot 138, the linkage 108 tends to remain "locked" in the closed position, thus maintaining the hand truck 103 in a secured state. Specifically, in the closed position, the first link 134 and the second link 136 are not aligned along a common axis, but rather are slightly angled with respect to each other. In effect, an over top dead center locking approach is used in this specific embodiment.

Referring to FIG. 3A, the first link 134 has a longitudinal axis B, and the second link 136 has a longitudinal axis C. The axes B and C, intersect each other and define an included angle θ. As illustrated, the angle θ is approximately 2° to 5°. The angle θ varies depending upon the desired clamping force, as described below.

A stop, such as a stop bolt 144, is positioned to prevent the linkage 108, when it is the closed position as shown, from moving leftwardly toward the side plate 114 under the action of force applied through the linkage 108 to the clamp member 112 when the lever 106 is lowered from the raised position to the lowered position. In moving the lever 106 from the open position to the closed position, the first and second links 134, 136 pass through a point at which they are aligned with each other (the "over center" position), which is shown in dashed lines in FIG. 3B. In the over center position, the upper link 134 remains spaced from the stop bolt 144, as shown in FIG. 3B.

The bracket 150, bracket nut 153, adjustment bolt 152, top plate 149, upper guide bolt 146 and upper guide bolt slot 148 form an adjustment arrangement that allows the clamping force exerted by the clamp member 112 and base 110 (e.g., on the base portion 162 of the hand truck 103) to be adjusted. For example, referring to FIG. 2, if the adjustment bolt 152 is rotated clockwise (i.e., tightened), the adjustment bolt 152 urges the top plate 149 downwardly (thus increasing the distance between the top plate 149 and the bracket 150 and decreasing the angle θ). The upper link 134 and the lower link 136 are also lowered in the vertical direction, thus increasing the force exerted through the second member 112 when the carrier 103 is in the closed position. The slot 148, when oriented vertically, constrains the upper guide bolt 146 to move vertically. Conversely, rotation of the bolt in a counter clockwise direction reduces the clamping force. This also allows the carrier to support handle trucks having blades or other supports of different thicknesses.

FIG. 4 shows the carrier 102 with the cover plate 154 in place over the carrier body 102a. The cover plate 154 may be fitted with resilient pads (not shown) to diminish noise and other vibrations from contact with the frame 164 of the hand truck 103, which may bear against the cover plate 154 when the hand truck 103 is secured in the carrier 102. The cover plate 154 in the form shown is installed by positioning it between the side plates 114, 116, and then inserting the bolts 128, 140, 144 and 146 through respective holes in the cover plate 154. The adjustment bolt 152, which may have an Allen head configuration, is accessed through an aperture 156 in the cover 154. As shown, slots 143 and 149 in the cover plate 154 correspond to the slots 148 and 142, respectively, in the rear plate 118.

The carrier 102 securely holds the hand truck 103 during transit, yet allows an operator to have ready access to the hand truck 103, e.g., at delivery stops. The carrier 102 holds the hand truck 103 securely without the use of separate bungie cords, springs or other straps, which are difficult to use correctly, are easily lost and detract from the aesthetic appearance of the vehicle. The various components of the carrier 102 may be made of metal or other suitable durable material, except as otherwise noted.

The carrier 102 secures the hand truck 103 to the vehicle 100 by clamping the hand truck 103 to the carrier 102. Thus, an adjustable clamping force is applied by at least one surface (i.e., the clamp member 112) that is movable relative to another surface (i.e., the base 110). The clamping force is applied in a substantially normal direction with respect to the base portion 162 of the hand truck 103.

According to an alternative embodiment, the mechanism that raises and lowers the clamp member 112 may be automatically actuated, e.g., by an electrical or pneumatic energy source. An automatically actuated mechanism may be more convenient to use in some applications than a manually operated mechanism. Also, an automatically actuated mechanism may provide a simpler way of preventing theft of a hand truck secured in the carrier than a manually actuated mechanism typically requiring use of a separate lock.

The automatically actuated mechanism may be configured to permit alternative manual actuation, or may be restricted to automatic actuation. Maintaining a manual actuation mode may be desirable to allow operation of the carrier 102 in the event that the automatically actuated mechanism fails.

In general, the automatically actuated mechanism has an energy source connected to supply energy through a switch to a device that converts energy from the energy source into mechanical energy (e.g., an electrical or pneumatic solenoid). This device is operatively coupled to the carrier, e.g., to a point on the linkage 108, and acts to raise and lower the clamp member 112. The switch may be located inside the vehicle for convenience and greater security or outside the vehicle (e.g., adjacent the carrier 102). Of course, redundant switches located both inside and outside the vehicle could be used.

Figure 5:
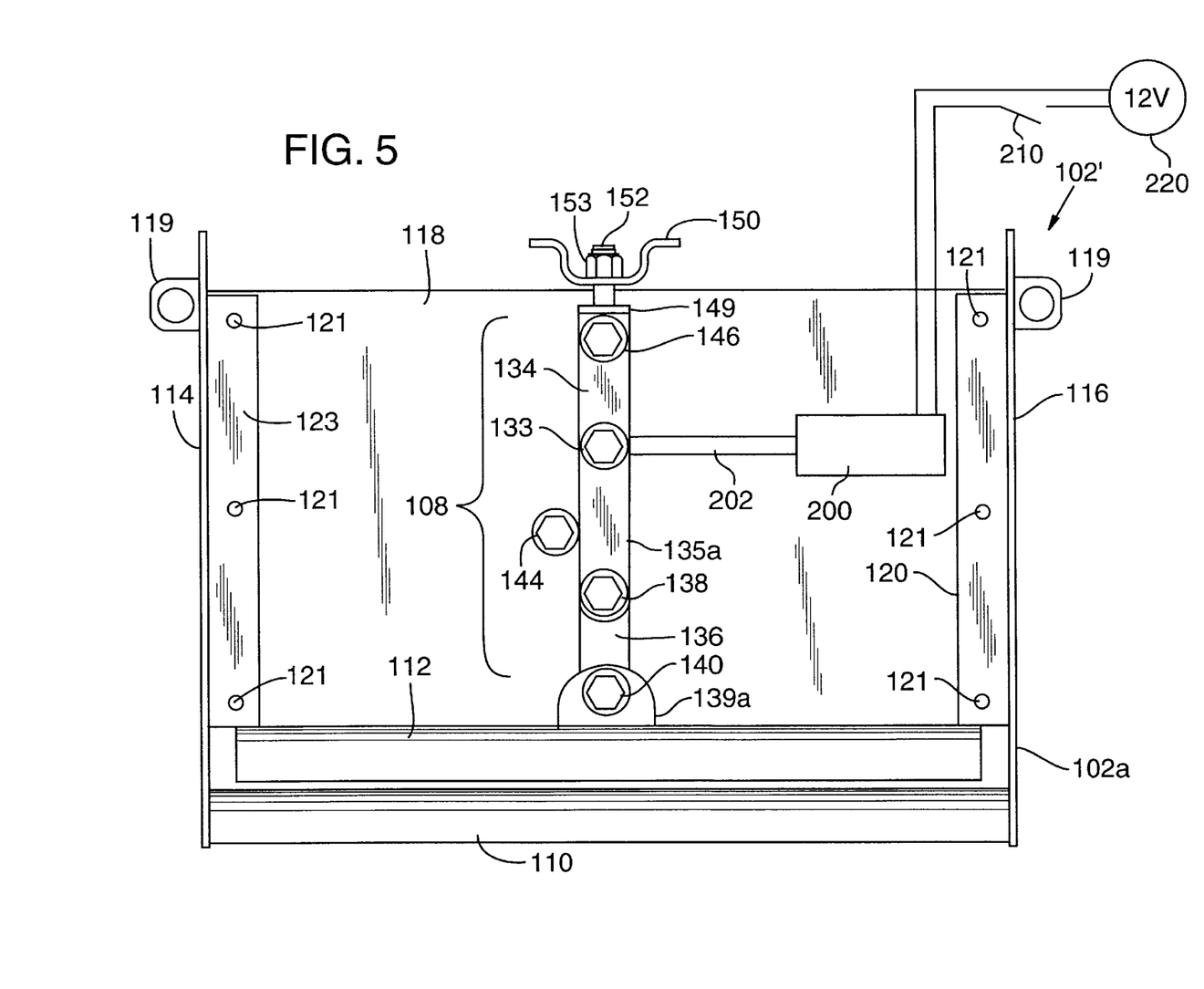
FIG. 5 is a front view, similar to FIG. 3A, of an alternative implementation in which the hand truck carrier is electrically actuated.

In a specific implementation as shown in FIG. 5, a carrier 102' has an electrically actuated mechanism that raises and lowers the clamp member 112. In the carrier 102', the mechanism is powered by a DC electrical source 220, e.g., the vehicle battery, which is connected through a normally open switch 210 to a solenoid 200. The solenoid 200 is fixed to the carrier 102', and includes a movable element 202 that is pivotably connected to one of the upper and lower links 134, 136, e.g., at the connecting member bolt 133 as shown. When the carrier 102' is in the closed position as shown, the movable element 202 is fully extended.

As described above, the switch 210 can be located on either the exterior or the interior of the vehicle 100. When the user actuates the switch 210, power is supplied to the solenoid 200, causing the movable element 202 to retract (i.e., to move rightward), which in turn moves the upper link 134 and the lower link 136, thus lifting the clamp member 112.

Figure 6:
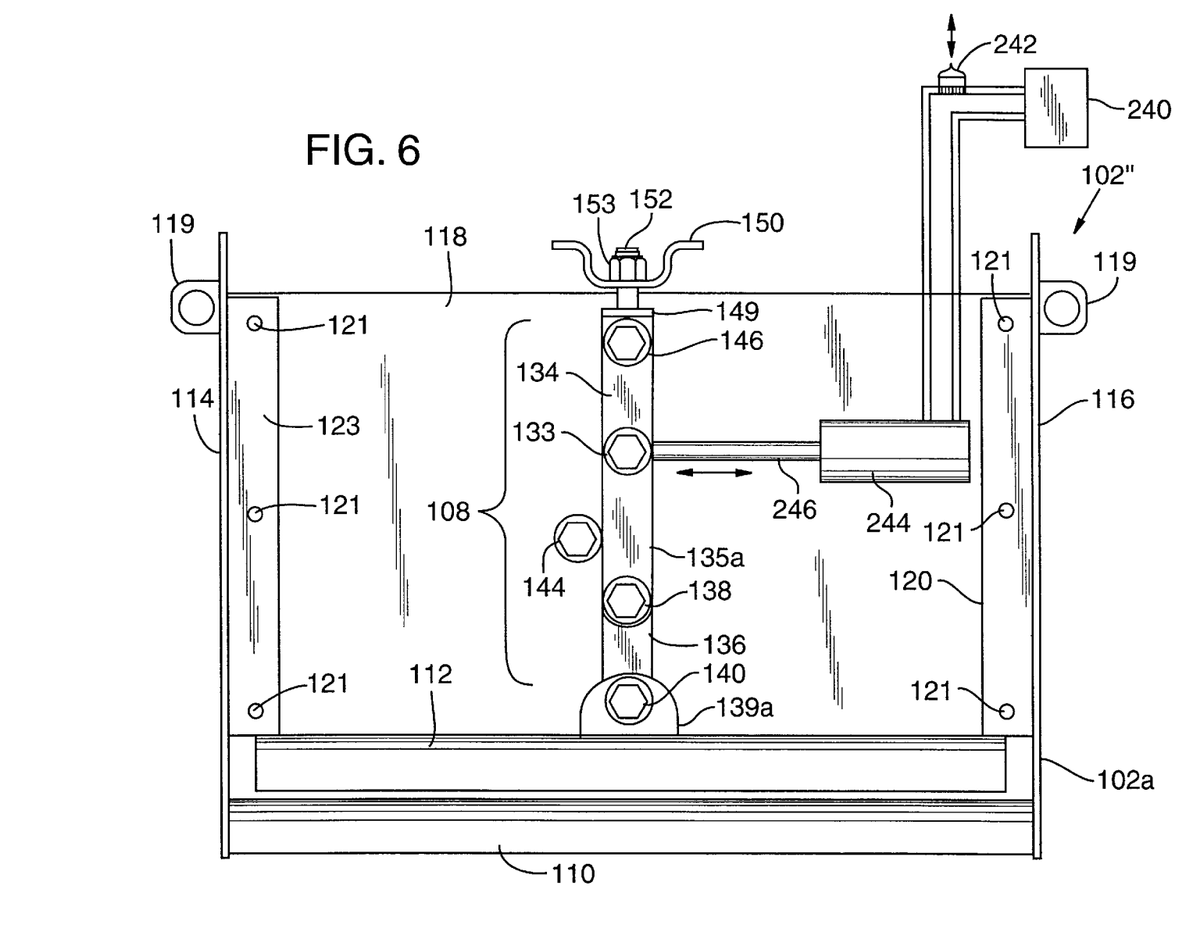
FIG. 6 is a front view, similar to FIG. 3A, of another alternative implementation in which the hand truck carrier is pneumatically actuated.

In another specific implementation as shown in FIG. 6, a carrier 102" has a pneumatically actuated mechanism that raises and lowers the clamp member 112. In the carrier 102", the mechanism is powered by a pneumatic source 240, e.g., the same source that powers conventional truck airbrakes. The pneumatic source 220 is connected through a normally open pneumatic switch 242 to a pneumatic solenoid 244. The solenoid 244 is fixed to the carrier 102", and includes a movable element 246 that is pivotably connected to one of the upper and lower links 134, 136, similar to the movable element 202 of the carrier 102'.

As in the case of the electrically actuated carrier 102', when the user actuates the switch 242, pneumatic power is supplied to the solenoid 244, creating a vacuum that causes the movable element 246 to retract (i.e., to move rightward), which in turn moves the upper link 134 and the lower link 136 thus lifting the clamp member 112.

Having illustrated and described the principles of our invention with reference to several preferred embodiments, it should be apparent to those of ordinary skill in the art that the invention may be modified in arrangement and detail without departing from such principles. For example, rivets or other pivots or fasteners may be used instead of the various bolts described above. In addition, a biasing mechanism may be used to bias the clamping elements in a closed position, in addition to, or alternatively to the over top dead center latching approach described above, although less desirable. We claim all such modifications as fall within the scope of the following claims.

What is claimed is:

1. A hand truck carrier for securing a hand truck to a vehicle or other support, the hand truck having a projecting load carrying element and an upwardly extending frame joined to the load carrying element, the carrier comprising:
   a carrier body attachable to the support;
   first and second members coupled to the carrier body, the first member being stationary, and the second member being movable relative to the first member so that the members are selectively positionable in at least an open position and a closed position;
   the members in the open position being spaced apart from each other to define therebetween a hand truck load carrying element receiving space in which the projecting load carrying element can be received; and
   the members in the closed position being positioned closer to each other than in the open position, whereby the members in the closed position are positioned to apply a clamping force to opposite surfaces of the load carrying element, respectively, thereby securing the hand truck to the hand truck carrier,
   wherein the carrier body includes a linkage mechanism with a handle that is pivotably attached to the carrier body and a linkage coupled to the handle, to the carrier body and to the second member, and wherein moving the lever moves the linkage and the second member relative to the other member between the open and closed positions.

2. A hand truck carrier for securing a hand truck to a vehicle or other support, the hand truck having a projecting load carrying element and an upwardly extending frame joined to the load carrying element, the carrier comprising:
   a carrier body attachable to the support;
   first and second members coupled to the carrier body, the first member being stationary, and the second member being movable relative to the first member so that the members are selectively positionable in at least an open position and a closed position;
   the members in the open position being spaced apart from each other to define therebetween a hand truck load carrying element receiving space in which the projecting load carrying element can be received; and
   the members in the closed position being positioned closer to each other than in the open position, whereby the members in the closed position are positioned to apply a clamping force to opposite surfaces of the load carrying element, respectively, thereby securing the hand truck to the hand truck carrier,
   wherein the carrier body includes a linkage mechanism with a handle and a linkage coupled to the handle, to the carrier and to the second member, and wherein moving the lever moves the linkage and the second member relative to the other member between the open and closed positions, and
   wherein the linkage includes a first link that is pivotably connected at a first end to the carrier body and a second link that is pivotably connected at a first end to the second member, and wherein the first and second links have second ends that are pivotably connected to each other.

3. The hand truck carrier of claim 2, wherein the linkage includes a connecting member that is pivotably connected at one end to the first link and pivotably connected at a second end to the lever.

4. The hand truck carrier of claim 2, wherein the first end of the second link is pivotably connected to the second member by a pivot that extends through a slot formed in the carrier body, and wherein movement of the pivot and the second member is constrained by the slot.

5. The hand truck carrier of claim 2, wherein the first end of the first link is pivotably connected to the carrier body by a pivot that extends through a slot formed in the carrier body, and wherein the pivot is constrained to move within the slot.

6. The hand truck carrier of claim 5, further comprising an adjustment arrangement that allows the clamping force exerted by the first and second members to be adjusted, the arrangement including a bracket attached to the carrier body having a adjustment bolt threadedly received therein that bears against the first link, wherein rotating the adjustment bolt causes the first link to move in a direction of the slot, thereby moving the attached second link and second member and changing the clamping force.

7. A hand truck carrier for securing a hand truck to a vehicle or other support, the hand truck having a projecting load carrying element and an upwardly extending frame joined to the load carrying element, the carrier comprising:

a carrier body attachable to the support;

first and second members coupled to the carrier body, the first member being stationary, and the second member being movable relative to the first member so that the members are selectively positionable in at least an open position and a closed position;

the members in the open position being spaced apart from each other to define therebetween a hand truck load carrying element receiving space in which the projecting load carrying element can be received, and the members in the closed position being positioned closer to each other than in the open position, whereby the members in the closed position are positioned to apply a clamping force to opposite surfaces of the load carrying element, respectively, thereby securing the hand truck to the hand truck carrier, wherein the carrier body includes a linkage mechanism with a handle and a linkage coupled to the handle, to the carrier body and to the second member, and wherein moving the lever moves the linkage and the second member relative to the other member between the open and closed positions, and wherein the carrier body includes a slot through which the handle extends.

8. A hand truck carrier for securing a hand truck to a vehicle or other support, the hand truck having a projecting load carrying element and an upwardly extending frame joined to the load carrying element, the carrier comprising:

a carrier body attachable to the support;

first and second members coupled to the carrier body, the first member being stationary, and the second member being movable relative to the first member so that the members are selectively positionable in at least an open position and a closed position;

the members in the open position being spaced apart from each other to define therebetween a hand truck load carrying element receiving space in which the projecting load carrying element can be received; and the members in the closed position being positioned closer to each other than in the open position, whereby the members in the closed position are positioned to apply a clamping force to opposite surfaces of the load carrying element, respectively, thereby securing the hand truck to the hand truck carrier, wherein the carrier body includes a linkage mechanism with a handle and a linkage coupled to the handle, to the carrier body and to the second member, and wherein moving the lever moves the linkage and the second member relative to the other member between the open and closed positions, and wherein the carrier body includes a stop positioned to prevent the linkage from moving beyond a predetermined position.

9. The hand truck carrier of claim 3, wherein the handle is pivotably connected to the carrier body by a lever pivot bolt, the connecting member is pivotably connected to the lever by a connecting bolt, and the connecting bolt is offset from the lever pivot bolt.

10. The hand truck carrier of claim 2, wherein the first link is angled with respect to the second link when the carrier is in the closed position.

11. The hand truck carrier of claim 2, wherein the first link is alignable with the second link at a point in the movement of the lever from the closed position to the open position.

12. A hand truck carrier for securing a hand truck to a vehicle or other support, the hand truck having a projecting load carrying element and an upwardly extending frame joined to the load carrying element, the carrier comprising:

a carrier body attachable to the support;

first and second members coupled to the carrier body, the first and second members being selectively positionable in at least an open position and a closed position;

the members in the open position being spaced apart from each other to define therebetween a hand truck load carrying element receiving space in which the projecting load carrying element can be received; and the members in the closed position being positioned closer to each other than in the open position, whereby the members in the closed position are positioned to apply a clamping force to opposite surfaces of the load carrying element, respectively, thereby securing the hand truck to the hand truck carrier, wherein the carrier body includes an electrically actuated linkage mechanism coupled to at least one of the first and second members and operable to selectively move at least said one of the first and second members relative to the other of the first and second members between the open and closed positions, and wherein the mechanism includes a solenoid, and an electrical power source and switch connected to the solenoid, and wherein actuating the switch causes power from the power source to actuate the solenoid and move the member to which the mechanism is coupled.

13. The hand truck carrier of claim 12, wherein the mechanism includes a linkage with an interconnected first link and second link, and wherein the solenoid has a moving element connected to the linkage.

14. The hand truck carrier of claim 13, wherein the moving element is pivotably connected to the first link.

15. A hand truck carrier for securing a hand truck to a vehicle or other support, the hand truck having a projecting load carrying element and an upwardly extending frame joined to the load carrying element, the carrier comprising:

a carrier body attachable to the support;

first and second members coupled to the carrier body, the first and second members being selectively positionable in at least an open position and a closed position;

the members in the open position being spaced apart from each other to define therebetween a hand truck load carrying element receiving space in which the projecting load carrying element can be received; and the members in the closed position being positioned closer to each other than in the open position, whereby the members in the closed position are positioned to apply a clamping force to opposite surfaces of the load carrying element, respectively, thereby securing the hand truck to the hand truck carrier, wherein the carrier body includes a pneumatically actuated linkage mechanism coupled to at least one of the first and second members and operable to selectively move at least said one of the first and second members relative to the other of the first and second members between the open and closed positions, and wherein the mechanism includes a pneumatic solenoid, and a pneumatic power source and switch connected to the pneumatic solenoid, and wherein actuating the switch causes pneumatic force from the pneumatic source to actuate the pneumatic solenoid and move the member to which the mechanism is coupled.

16. The hand truck carrier of claim 15, wherein the mechanism includes a linkage with an interconnected first link and second link, and wherein the pneumatic solenoid has a moving element connected to the linkage.

17. The hand truck carrier of claim 16, wherein the moving element is pivotably connected to the first link.

18. A method for detachably securing a hand truck to a hand truck carrier, the hand truck having a projecting load carrying element, the method comprising:

receiving the load carrying element of the hand truck between a stationary base and an opposed movable clamp member of the carrier; and contacting opposite surfaces of the load carrying element and exerting a clamping force thereon with the base and the clamp member, thereby securing the hand truck to the hand truck carrier.

19. The method of claim 18, wherein the base and clamp member are substantially horizontal, and wherein the act of contacting includes slidably moving the clamp member in a substantially vertical direction relative to the base.

20. The method of claim 18, including the act of adjusting the clamping force.

21. A vehicle mounted hand truck carrier for securing a hand truck to a vehicle, the hand truck having a base plate and side rails, the carrier comprising:

a carrier body mounted to the vehicle, wherein the carrier body has a base, first and second side plates extending from the base, the second side plate having a lever slot and a side locking eyelet, and a rear plate extending between the first and second side plates;

a clamp member movably coupled to the carrier body and positioned opposite the base;

a lever extending through and movable within the lever slot in the second side plate, the lever having an interior end that is pivotably connected to the carrier body and a lever locking eyelet alignable with side locking eyelet in the second side plate; and a linkage connecting the lever to the clamp member, the linkage having a connecting member pivotably connected to the lever, a first link pivotably connected to the connecting member and to the carrier body, and a second link pivotably connected to the first link and to the clamp member, wherein the lever is pivotable to move the linkage and the clamp member between an open position and a closed position, the clamp member in the open position being spaced from the base, and the clamp member in the closed position being positionable to exert a clamping force on a base portion of a hand truck received between the clamp member and the base.

22. The vehicle mounted hand truck carrier of claim 21, further comprising a clamping force adjustment arrangement that includes a bracket mounted to the carrier, an adjustment bolt threadedly received in the bracket and positioned to bear against the first link, the first link being movably connected to the carrier body by a pivot bolt extending through a slot in the rear plate, and wherein rotating the adjustment bolt moves the pivot bolt within the slot, thereby moving the first link and adjusting the clamping force.

23. The vehicle mounted hand truck carrier of claim 21, further comprising a cover that attaches to the carrier body.

24. A hand truck carrier for mounting to a vehicle or other support and for supporting a hand truck with a projecting load carrying element, the carrier comprising:

a body;

first and second clamping elements, at least one of which is movable in a first direction relative to the body at least between an open position and closed position, the first and second clamping elements defining a load carrying element receiving slot therebetween, the spacing between the first and second clamping elements and thereby the slot dimension between such clamping elements being reduced when the at least one of the clamping elements is in the closed position; and an over top dead center latching mechanism coupled to the at least one of the clamping elements and operable to move the at least one clamping element in the first direction.

* * * * *